United States Patent
Smith et al.

(10) Patent No.: US 11,887,028 B2
(45) Date of Patent: Jan. 30, 2024

(54) SYSTEMS AND METHODS FOR SCHEDULING TRACK MAINTENANCE

(71) Applicant: BNSF RAILWAY COMPANY, Fort Worth, TX (US)

(72) Inventors: Mitchel Jeffrey-Roy Smith, Fort Worth, TX (US); Daniel Phillip Clark, Trophy Club, TX (US); Karl Lewin, Grapevine, TX (US); Jose Gerardo Garza, Fort Worth, TX (US); Christopher Jason Thompson, Grapevine, TX (US)

(73) Assignee: BNSF Railway Company, Fort Worth, TX (US)

( * ) Notice: Subject to any disclaimer, the term of this patent is extended or adjusted under 35 U.S.C. 154(b) by 96 days.

(21) Appl. No.: 16/830,054

(22) Filed: Mar. 25, 2020

(65) Prior Publication Data
US 2021/0304095 A1    Sep. 30, 2021

(51) Int. Cl.
G06Q 10/0631    (2023.01)
E01B 37/00    (2006.01)
G06F 3/0481    (2022.01)

(52) U.S. Cl.
CPC ........ *G06Q 10/06311* (2013.01); *E01B 37/00* (2013.01); *G06F 3/0481* (2013.01)

(58) Field of Classification Search
None
See application file for complete search history.

(56) References Cited

U.S. PATENT DOCUMENTS

| 5,794,172 | A | * | 8/1998 | Matheson | ............... | B61L 27/16 |
| | | | | | | 246/2 R |
| 7,171,372 | B2 | * | 1/2007 | Daniel | ............. | G06Q 10/06312 |
| | | | | | | 705/7.29 |
| 7,222,083 | B2 | * | 5/2007 | Matheson | ............... | B61L 27/16 |
| | | | | | | 706/45 |
| 2003/0236598 | A1 | * | 12/2003 | Villarreal Antelo | | ........................ |
| | | | | | | B61L 27/0022 |
| | | | | | | 701/19 |
| 2007/0005200 | A1 | * | 1/2007 | Wills | ..................... | G06Q 10/06 |
| | | | | | | 701/19 |
| 2012/0323615 | A1 | * | 12/2012 | Johnson | ........... | G06Q 10/06311 |
| | | | | | | 705/7.11 |

(Continued)

OTHER PUBLICATIONS

Lambert et al, Microsoft Outlook (Year: 2013).*

(Continued)

*Primary Examiner* — Mohamed N El-Bathy
(74) *Attorney, Agent, or Firm* — Whitaker Chalk Swindle & Schwartz, PLLC; Enrique Sanchez, Jr.

(57) ABSTRACT

In one embodiment, a method includes generating a first visual representation of a location of a railroad station in relation to a railroad track, receiving a request for a first maintenance window, and determining that the first maintenance window is associated with the railroad station. The method further includes determining a first time period and generating a second visual representation of information associated with the railroad station during the first time period. The information includes an indication of a time that a train is scheduled to cross the railroad station during the time period. The information also includes an indication of a time duration for a second maintenance window that has been requested during the time period.

18 Claims, 4 Drawing Sheets

(56) References Cited

U.S. PATENT DOCUMENTS

| | | | | |
|---|---|---|---|---|
| 2014/0350989 A1* | 11/2014 | Telatar | ............... | G06Q 10/1097 |
| | | | | 705/7.21 |
| 2014/0365260 A1* | 12/2014 | Tays | ..................... | G06F 16/248 |
| | | | | 705/7.15 |
| 2015/0142225 A1* | 5/2015 | Tonguz | ................... | B61L 19/06 |
| | | | | 701/19 |
| 2016/0292627 A1 | 10/2016 | Yamada | | |
| 2017/0043799 A1* | 2/2017 | Shubs | ..................... | B61L 27/57 |
| 2017/0357929 A1* | 12/2017 | Shubs, Jr. | ............... | B61L 27/18 |
| 2021/0001906 A1* | 1/2021 | Wang | ..................... | B61L 27/40 |

OTHER PUBLICATIONS

Cardenas et al, An autonomous system for maintenance scheduling data-rich complex infrastructure: Fusing the railways' condition, planning and cost (Year: 2018).*

Lin et al., An interactive train scheduling workbench based on artificial intelligence (Year: 1994).*

Patent Cooperation Treaty, International Search Report and Written Opinion, International Application No. PCT/US2021/021808, dated Jun. 25, 2021, 15 pages.

Eskandarzadeh, S. et al., "Maintenance Scheduling in a Railway Corridor," XP081519465, Cornell University Library, Oct. 23, 2019, 25 pages.

Saman Eskandarzadeh, et al.; "Maintenance Scheduling in A Railway Corridor": Article: arxiv. org, Cornell University Library, NY 14853; Mar. 23, 2019; 26 pages.

PCT International Patent Application No. PCT/US2021/021808, filing date Nov. 3, 2021, International Search Report and Written Opinion, 10 pages.

\* cited by examiner

SYSTEMS AND METHODS FOR SCHEDULING TRACK MAINTENANCE

TECHNICAL FIELD

This disclosure generally relates to track maintenance, and more specifically to systems and methods for scheduling track maintenance.

BACKGROUND

Train dispatchers direct and facilitate the movement of trains over an assigned territory (e.g., a railroad operating division). The dispatchers schedule railroad maintenance and are responsible for ensuring that the railroad tracks are clear during the scheduled maintenance. While train dispatchers may use existing capacity planning tools to assist them in scheduling maintenance windows, these capacity planning tools are often unreliable and/or inefficient.

SUMMARY

According to an embodiment, a method includes generating a first visual representation of a location of a railroad station in relation to a railroad track, receiving a request for a first maintenance window, and determining that the first maintenance window is associated with the railroad station. The method further includes determining a first time period and generating a second visual representation of information associated with the railroad station during the first time period. The information includes an indication of a time that a train is scheduled to cross the railroad station during the time period. The information also includes an indication of a time duration for a second maintenance window that has been requested during the time period. The request for the first maintenance window may include a name of a maintenance crew, a requested time duration for the first maintenance window, and a maintenance description.

In certain embodiments, the method includes scheduling the first maintenance window within the first time period based on the second visual representation. In some embodiments, the method includes determining, based on the second visual representation, that a requested time duration for the first maintenance window conflicts with the time that the train is scheduled to cross the railroad station during the first time period and selecting a second time period. In certain embodiments, the method includes determining, based on the second visual representation, that a requested time duration for the first maintenance window conflicts with the time duration of the second maintenance window during the first time period and selecting a second time period.

In some embodiments, the method includes generating, in the first visual representation, locations for a plurality of railroad stations in relation to a plurality of railroad tracks, determining that the request for the first maintenance window is associated with a subset of the plurality of railroad stations, and generating, in the second visual representation, information associated with the subset of the plurality of railroad stations. In certain embodiments, the method includes generating a map view that displays the first maintenance window and/or generating a calendar that displays a date and time duration for the first maintenance window.

According to another embodiment, a system includes one or more processors and a memory storing instructions that, when executed by the one or more processors, cause the one or more processors to perform operations including generating a first visual representation of a location of a railroad station in relation to a railroad track, receiving a request for a first maintenance window, and determining that the first maintenance window is associated with the railroad station. The operations further include determining a first time period and generating a second visual representation of information associated with the railroad station during the first time period. The information includes an indication of a time that a train is scheduled to cross the railroad station during the time period. The information also includes an indication of a time duration for a second maintenance window that has been requested during the time period.

According to yet another embodiment, one or more computer-readable storage media embody instructions that, when executed by a processor, cause the processor to perform operations including generating a first visual representation of a location of a railroad station in relation to a railroad track, receiving a request for a first maintenance window, and determining that the first maintenance window is associated with the railroad station. The operations further include determining a first time period and generating a second visual representation of information associated with the railroad station during the first time period. The information includes an indication of a time that a train is scheduled to cross the railroad station during the time period. The information also includes an indication of a time duration for a second maintenance window that has been requested during the time period.

Technical advantages of certain embodiments of this disclosure may include one or more of the following. Certain systems and methods described herein include a maintenance planning tool that assists in maximizing railroad track capability through visualization of traffic gaps. The maintenance planning tool may assist in reducing idle time on capacity constrained operating subdivisions. The maintenance planning tool may reduce and/or avoid train delays. Systems and methods described herein use visual aids to allow for more accurate maintenance compliance reporting as compared to traditional, non-visual systems and methods for scheduling track maintenance. For example, the systems and methods described herein may more accurately report the number of cancelled maintenance windows, the number of hours maintenance crews spend waiting for maintenance to begin, the hourly costs incurred by a company for those hours, and the like.

The maintenance planning tool of this disclosure allows users to maximize usage of visual gaps in train flow. The systems and methods described herein for scheduling track maintenance provide for more proactive decision-making as compared to traditional systems. For example, maintenance crews, maintenance planners, and/or dispatchers can quickly and proactively identify and move maintenance to gaps in train flow. The systems and methods described herein reduce maintenance costs by reducing maintenance crew start/stops, reducing the hours spent by maintenance crews waiting to begin maintenance, and reducing maintenance window cancellations.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Figure 1:
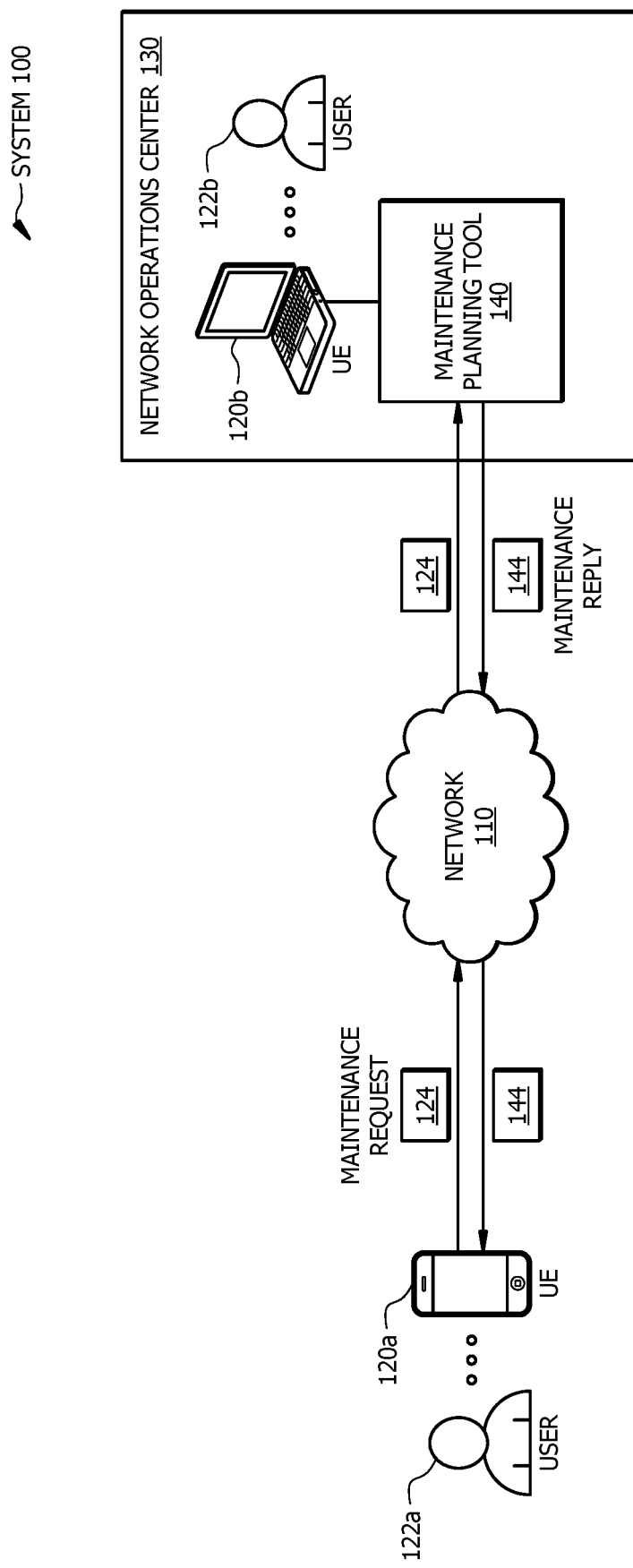
FIG. 1 illustrates an example system for scheduling track maintenance.
Figure 2:
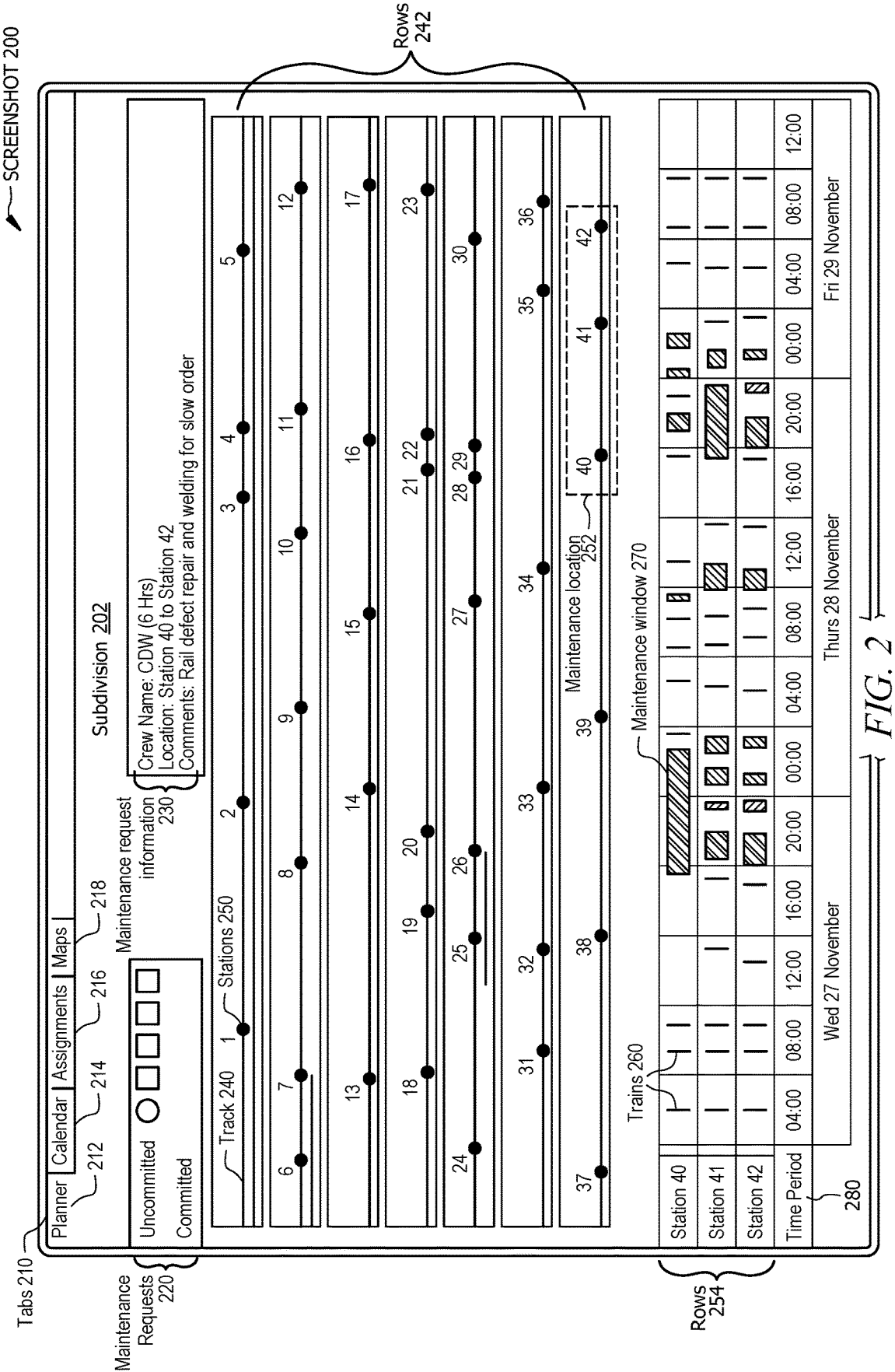
FIG. 2 illustrates a screenshot generated by a maintenance planning tool that may be used by the system of FIG. 1.
Figure 3:
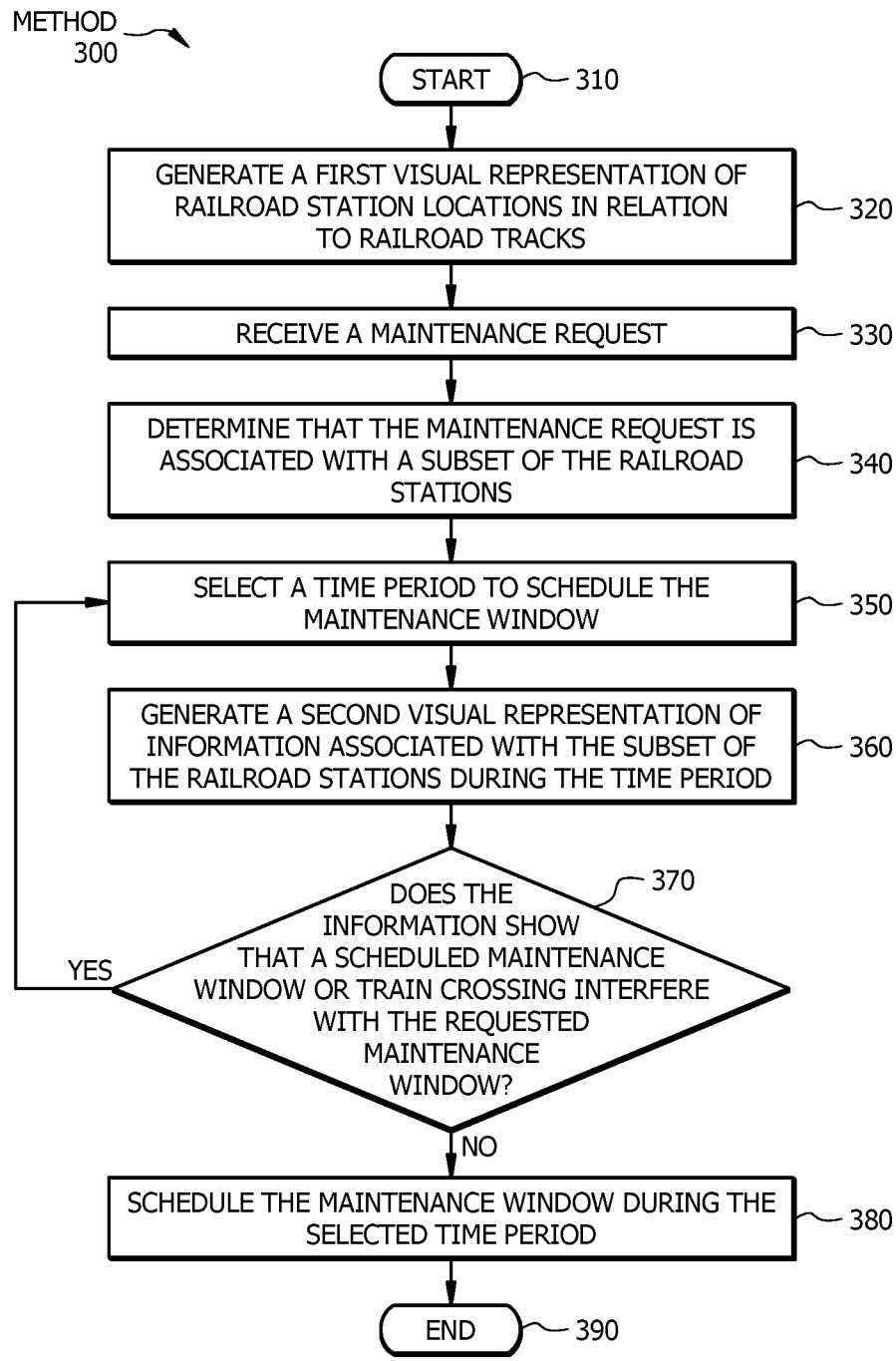
FIG. 3 illustrates an example method for scheduling track maintenance.
Figure 4:
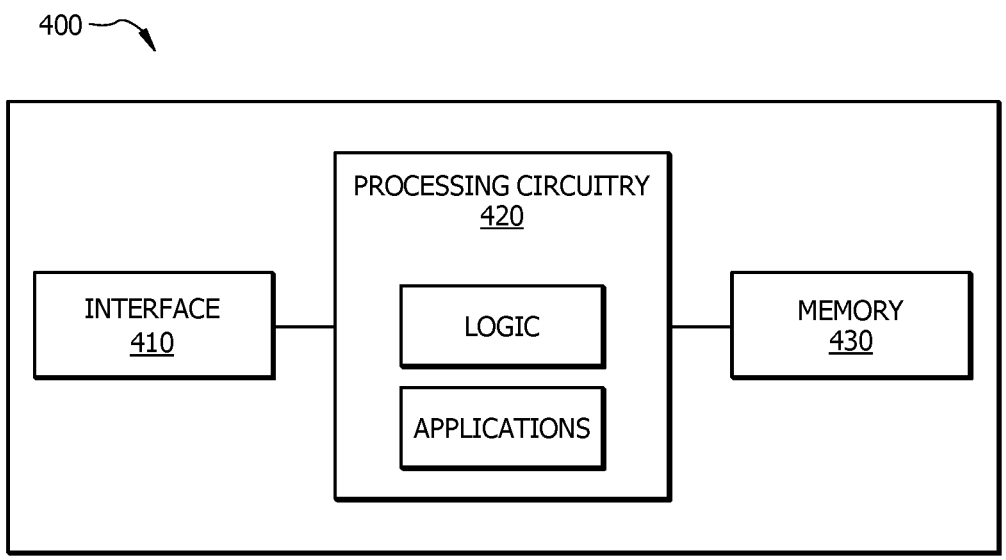
FIG. 4 illustrates an example computer system that may be used by the systems and methods described herein.

Certain embodiments of this disclosure include systems and methods for scheduling track maintenance using a maintenance visual planning tool. The maintenance visual planning tool allows users (e.g., maintenance planners and corridor superintendents) to visualize traffic gaps ahead of time. FIGS. 1 through 5 show example systems and methods for scheduling track maintenance. FIG. 1 shows an example system for scheduling track maintenance, and FIG. 2 shows a screenshot generated by a maintenance planning tool that may be used by the system of FIG. 1. FIG. 3 shows an example method for scheduling track maintenance. FIG. 4 shows an example computer system that may be used by the systems and methods described herein.

FIG. 1 illustrates an example system 100 for scheduling track maintenance. System 100 of FIG. 1 includes a network 110, user equipment (UE) 120a, UE 120b, a user 122a, a user 122b, a maintenance request 124, a network operations center 130, a maintenance planning tool 140, and a maintenance reply 144. System 100 or portions thereof may be associated with an entity, which may include any entity, such as a business, company (e.g., a railway company, a transportation company, etc.), or a government agency (e.g., a department of transportation, a department of public safety, etc.) that may schedule maintenance. While the illustrated embodiment of FIG. 1 is associated with a railroad system, system 100 may be associated with any suitable transportation system (e.g., vehicles/roadways, vessels/waterways, and the like).

The elements of system 100 may be implemented using any suitable combination of hardware, firmware, and software. For example, one or more components of system 100 may use one or more components of FIG. 4.

Network 110 of system 100 may be any type of network that facilitates communication between components of system 100. For example, network 110 may connect UE 120a of system 100 to UE 120b of system 100. Although this disclosure shows network 110 as being a particular kind of network, this disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of network 110 may include one or more access (e.g., mobile access), core, and/or edge networks. Network 110 may be any communications network, such as a private network, a public network, a connection through Internet, a mobile network, a WI-FI network, a Bluetooth network, etc. Network 110 may include cloud computing capabilities. One or more components of system 100 may communicate over network 110. For example, UE 120a may communicate over network 110, including transmitting information (e.g., maintenance request 124) to UE 122b and/or receiving information (e.g., maintenance reply 144) from UE 120b.

UE 120a of system 100 includes any device that can receive, create, process, store, and/or communicate information. For example, UE 120a of system 100 may communicate information (e.g., maintenance request 124) to UE 120b and/or receive information (e.g., maintenance reply 144) from UE 120b. In certain embodiments, UE 120a is used directly by user 122a. UE 120a may be a mobile phone (e.g., a smart phone), a tablet, a personal digital assistant, a wearable computer, a laptop computer, a desktop computer, and the like. In the illustrated embodiment of FIG. 1, UE 120a is a mobile device. UE 120a may include a liquid crystal display (LCD), an organic light-emitting diode (OLED) flat screen interface, digital buttons, a digital keyboard, physical buttons, a physical keyboard, one or more touch screen components, a graphical user interface (GUI), and the like.

In certain embodiments, UE 120a utilizes one or more applications. The applications of UE 120a may include native applications that are built for a specific operating system, mobile web applications that render and/or deliver pages on browsers, and the like. The browsers of UE 120a are software applications for accessing information on the World Wide Web. One or more browsers may be optimized to display Web content effectively for small screens.

User 122a of system 100 is any person, organization, or software program that utilizes UE 120a. For example, user 122a may be an engineer (e.g., a project engineer), a supervisor (e.g., a signal supervisor), a director (e.g., a signal director), a technician (e.g., an electronic technician), and the like. User 122a may utilize UE 120b. For example, user 122a may generate maintenance request 124 using UE 120b.

Maintenance request 124 of system 100 is a request to schedule maintenance in a specific region (e.g., a railroad subdivision). Maintenance request 124 may include a name of the crew that has been assigned to perform the maintenance, a location indicating where the maintenance is to take place, a description of the work to be performed, a requested time duration for the maintenance to be performed, requested dates for the maintenance to be performed, and the like. The name of the crew that has been assigned to perform the maintenance may be the name of a maintenance crew, a production gang, etc. The name of the crew may be represented by the initials of the crew, a crew number, a crew letter, a symbol, and the like.

In maintenance request 124, the location indicating where the maintenance is to take place may be an indication of any physical location. The location may be represented by an address (e.g., a street address), coordinates (e.g., Global Positioning System (GPS) coordinates), a marker (e.g., a train station, a train signal, a control point, a mile marker, etc.), a combination of the aforementioned, and the like. In maintenance request 124, the description of the work to be performed may include any maintenance description for track structure, signals or bridges, and the like. For example, the description may be "rail defect repair and welding for slow order," "slide fence upgrade and repair," "rail replacement," etc. The requested time duration for the maintenance may be represented as days, hours, minutes, etc.

User 122a may generate maintenance request 124 using one or more applications running on UE 120a. Maintenance request 124 may be a written communication (e.g., an email, a memo, etc.), a verbal communication (e.g., a phone call, a voicemail, etc.), a video communication (e.g., a video clip, FaceTime, etc.), and the like. Maintenance request 124 may include one or more words (e.g., sentences, paragraphs, etc.), pictures (e.g., photos of a repair site), and the like. In certain embodiments, user 122a generates maintenance request 124 and communicates, via network 110, maintenance request 124 to network operations center 130.

Network operations center 130 of system 100 is a facility with one or more locations that houses support staff who manage transportation-related traffic. For example, network operations center 130 may monitor, manage, and/or control the movement of trains across states, providences, and the like. Network operations center 130 may include transportation planning technology to facilitate collaboration between users 120a (e.g., engineers) and users 120b (e.g., dispatchers). In certain embodiments, network operations center 130 includes meeting rooms, televisions, workstations, and the like. Each workstation may include UE 120b that is operated by user 122b. In the illustrated embodiment of FIG. 1, network operations center 130 includes UE 120b, user 122b, and maintenance planning tool 140.

UE 120b of system 100 includes any device that can receive, create, process, store, and/or communicate information. For example, UE 120b of system 100 may communicate information (e.g., maintenance reply 144) to UE 120a and/or receive information (e.g., maintenance request 124) from UE 120a. In certain embodiments, UE 120b is used directly by user 122b. UE 120a may be a desktop computer, a laptop computer, a mobile phone (e.g., a smart phone), a tablet, a personal digital assistant, a wearable computer, and the like. In the illustrated embodiment of FIG. 1, UE 120b is a desktop computer. UE 120a may include an LCD, an OLED flat screen interface, digital buttons, a digital keyboard, physical buttons, a physical keyboard, one or more touch screen components, a GUI, and the like.

In certain embodiments, UE 120b utilizes one or more applications (e.g., maintenance planning tool 140). The applications of UE 120b may include native applications that are built for a specific operating system, mobile web applications that render and/or deliver pages on browsers, planning applications, and the like. In the illustrated embodiment of FIG. 1, UE 120b utilizes maintenance planning tool 140.

User 122b of system 100 is any person, organization, or software program that utilizes UE 120b. For example, user 122b may be dispatcher (e.g., a train dispatcher), support staff, a crew member, an engineer, a team member (e.g., a mechanical team member), a maintenance planner, a superintendent (e.g., a corridor superintendent), and the like. In certain embodiments, user 122b manages transportation-related traffic. For example, user 122b may authorize the movement of trains across one or more regions (e.g., states, territories, subdivisions, divisions, districts, etc.). User 122b may utilize UE 120b. For example, user 122b may use UE 120b to schedule one or more maintenance windows using maintenance planning tool 140.

Maintenance planning tool 140 of system 100 is a visual project management tool that allows users 122b to visualize traffic gaps. Maintenance planning tool 140 may be used to generate one or more images (e.g., screenshot 200 of FIG. 2). In certain embodiments, the images show a request for a maintenance window. The request may include a crew name, a requested time duration for the requested maintenance window, and a maintenance description.

In some embodiments, the images generated by maintenance planning tool 140 show the locations of one or more railroad stations in relation to one or more railroad tracks. For example, an image generated by maintenance planning tool 140 may show fifty railroad station locations along a track in a particular subdivision. In certain embodiments, the images indicate the location of the requested maintenance window in relation to the railroad stations and the track. In some embodiments, the images generated by maintenance planning tool 140 show information associated with the railroad station during the particular time period. The information shown in the images may include an indication of a time that a train is scheduled to cross a railroad station during the particular time period. The information shown in the images may include an indication of a time duration for a maintenance window that has been requested during the particular time period.

In certain embodiments, maintenance planning tool 140 allows user 122b to select the particular time period. For example, user 122b may select a 24-hour time period over the course of one or two days, and maintenance planning tool 140 may generate a snapshot of information associated with the railroad environment during that particular 24-hour time period. As another example, user 122b may select a 5-day time period associated with specific dates, and maintenance planning tool 140 may generate a snapshot of information associated with the railroad environment during that particular 5-day time period.

The visual images produced by maintenance planning tool 140 may assist user 122b in scheduling incoming maintenance requests 124. For example, the images may show a conflict between the requested maintenance location and a train crossing that particular location at a specific moment in time. As another example, the images may show a conflict between a previously requested and/or scheduled maintenance window and the maintenance window of maintenance request 124. User 122b may use one or more images generated by maintenance planning tool 140 to schedule maintenance request 124 during traffic gaps. After scheduling maintenance request 124, user 122b may generate maintenance reply 144.

Maintenance reply 144 of system 100 is a response to maintenance request 124. Maintenance reply 144 may include a maintenance window that indicates a specific time that the requested maintenance is scheduled to be performed. The maintenance window may include a time duration (e.g., 6 hours), a specific date (e.g., Jan. 1, 2020), an allotted start time for the maintenance (e.g., 6:00 a.m. on Jan. 1, 2020), an allotted end time for the maintenance (e.g., 2:00 p.m. on Jan. 1, 2020), etc. Maintenance reply 144 may include a name of the crew that has been assigned to perform the maintenance, a location indicating where the maintenance is to take place, a description of the work to be performed, and the like. In certain embodiments, user 122b generates maintenance reply 144 and communicates, via network 110, maintenance reply 144 to UE 120a. Maintenance reply 144 may be a written communication (e.g., an email, a memo, etc.), a verbal communication (e.g., a phone call, a voicemail, etc.), a video communication (e.g., a video clip, FaceTime, etc.), and the like.

In operation, user 122a (e.g., a train engineer) determines that maintenance needs to be performed at specific railroad stations along a railroad track in a particular railroad subdivision. User 122a uses UE 120a to generate maintenance request 124. Maintenance request 124 includes the specific railroad stations where the maintenance is to be performed, the name of the crew that is to perform the maintenance, a requested time duration (e.g., 6 hours) for the maintenance, and a maintenance description. Maintenance request 124 is communicated from UE 120a to network operations center 130 via network 110.

User 122b of network operations center 130 receives maintenance request 124 via UE 120b. User 122b predicts a time period within which to schedule the maintenance window. Using maintenance planning tool 140, user 122b selects the time period (e.g., a 48-hour time period starting at 6:00 a.m. on Jan. 1, 2020 and ending at 6:00 a.m. on Jan. 3, 2020). Maintenance planning tool 140 generates a first visual representation of the railroad environment in a particular subdivision where the maintenance is to take place. The first visual representation includes the location of the railroad stations in relation to the railroad track. User 122b selects, from the first visual representation, the railroad stations where maintenance is to be performed. In response to selecting the railroad stations, maintenance planning tool 140 generates a second visual representation of information associated with the selected railroad stations during the first time period. The information includes indications of the times that trains are scheduled to cross the railroad stations during the selected time period. The information also includes indications of time durations for previously requested and/or scheduled maintenance windows during the selected time period. The first visual representation and the second visual representation are displayed as a single image (e.g., screenshot 200 of FIG. 2) on UE 120b.

User 122b determines, using the image, to schedule the maintenance window of maintenance request 124 during the selected time period. For example, user 122b may determine, from the image, that no train crossings or previously requested/scheduled maintenance windows are within a 6-hour time duration starting at 6:00 a.m. on Jan. 1, 2020 to 2:00 p.m. on Jan. 1, 2020. As a result of this determination, user 122b may schedule the maintenance window from 6:00 a.m. on Jan. 1, 2020 to 2:00 p.m. on Jan. 1, 2020. User 122b uses UE 120b to generate maintenance reply 144, which includes information associated with the scheduled maintenance window. UE 120b communicates maintenance reply 144 to UE 120a via network 110. As such, system 100 of FIG. 1 allows users 122b to maximize usage of visual gaps in train flow, which may reduce idle time on capacity-constrained operating subdivisions.

Although FIG. 1 illustrates a particular arrangement of network 110, UE 120a, user 122a, maintenance request 124, network operations center 130, maintenance planning tool 140, UE 120b, user 122b, and maintenance reply 144, this disclosure contemplates any suitable arrangement of network 110, UE 120a, user 122a, maintenance request 124, network operations center 130, maintenance planning tool 140, UE 120b, user 122b, and maintenance reply 144. For example, maintenance planning tool 140 may operate on UE 120a instead of UE 120b. As another example, user 122a may schedule maintenance windows using maintenance planning tool 140 of UE 120 instead of generating maintenance requests 124.

Although FIG. 1 illustrates a particular number of networks 110, UEs 120a, users 122a, maintenance requests 124, network operations centers 130, maintenance planning tools 140, UEs 120b, users 122b, and maintenance replies 144, this disclosure contemplates any suitable number of networks 110, UEs 120a, users 122a, maintenance requests 124, network operations centers 130, maintenance planning tools 140, UEs 120b, users 122b, and maintenance replies 144. For example, FIG. 1 may include multiple maintenance requests 124 and/or multiple maintenance replies 144.

FIG. 2 illustrates an example screenshot 200 that may be generated by visual planning tool 140 of system 100 of FIG. 1. Screenshot 200 is an image displayed on a computer (e.g., UE 120b of FIG. 1) at a particular moment in time. Screenshot 200 shows an overview of subdivision 202. Screenshot 200 includes tabs 210, maintenance requests 220, maintenance request information 230, a track 240, rows 242, stations 250, a maintenance location 252, rows 254, trains 260, maintenance windows 270, and a time period 280.

Tabs 210 of screenshot 200 are navigation elements used to allow users (e.g., user 122b of FIG. 1) to access different areas of maintenance planning tool 140. Selecting (e.g., clicking or tapping) tab 210 directs a user to the tab-related content. In the illustrated embodiment of FIG. 2, tabs 210 include a planner tab 212, a calendar tab 214, an assignments tab 216, and a map tab 218. Planner tab 210 of screenshot 200 may be used to schedule a maintenance request. Planner tab 210 is selected in screenshot 200 of FIG. 2. Calendar tab 214 of screenshot 200 may be used to display a calendar that includes one or more maintenance requests. For example, the calendar may represent specific dates and/or times of requested and/or scheduled maintenance windows.

Assignments tab 216 of screenshot 200 may be used to display one or more maintenance-related assignments. The assignments may be presented in a list format. Each maintenance-related assignment may include the maintenance crew name, a subdivision where the maintenance is to take place, a date of the scheduled/requested maintenance, a number of maintenance windows requested per maintenance request, a location for the scheduled maintenance (e.g., a beginning/end mile post, a beginning/end control point, etc.), a number of tracks affected by the maintenance, a beginning time for the maintenance, a time duration of the maintenance, a description of the maintenance to be performed, and the like.

Map tab 218 of screenshot 200 displays a map of the requested/scheduled maintenance locations. The map is a diagrammatic representation of an area affected by the maintenance. The map may show the geographical locations of the railroad stations scheduled for maintenance in a particular area (e.g., subdivision 202). Each location scheduled for maintenance may be marked. The marking may include information about the scheduled maintenance (e.g., a maintenance crew name, the date/time/duration of the scheduled maintenance, etc.).

Maintenance requests 220 of screenshot 200 represent the number of maintenance requests received by maintenance planning tool 140. Each maintenance request 220 is represented by a shape. A first maintenance request 220 is represented by a circle, a second maintenance request 220 is represented by a square, and so on. In certain embodiments, maintenance requests 220 are categorized as either uncommitted or committed. Uncommitted maintenance requests 220 are maintenance requests that have not been scheduled. For example, uncommitted maintenance requests 220 may include maintenance requests that have not been authorized by a dispatcher. Committed maintenance requests 220 are requests that have been scheduled. For example, committed maintenance requests 220 may include maintenance requests that have been authorized by a dispatcher. The illustrated embodiment of FIG. 1 shows five uncommitted maintenance requests 220 and no committed maintenance requests 220.

Maintenance request information 230 of screenshot 200 is the information included in incoming maintenance request 220. Maintenance request information 230 includes a crew name (e.g., CDW), a requested maintenance window (e.g., 6 hours), a maintenance location (e.g., station 40 to station 42), and comments related to the maintenance (e.g., rail defect repair and welding for slow order). Maintenance request information 230 is specific to a particular maintenance request 220. In the illustrated embodiment of FIG. 1, circle-shaped maintenance request 220 has been selected. If a user selects square-shaped maintenance request 220, maintenance request information 230 will change to reflect the information included in square-shaped maintenance request 220.

Track 240 of screenshot 200 is a graphical representation of a railroad track of subdivision 202. Track 240 is represented as one or more lines in rows 242. The line representing track 240 is broken between rows 242 to allow a user of the maintenance planning tool to visualize entire track 240 in one image. A single line represents a single track 240 and a double line represents double tracks 240.

Stations 250 of screenshot 200 are markers that indicate a particular location along track 240. Stations 250 may represent one or more railroad stations, control points, railroad signals, a mile posts, a combination thereof, or any other suitable marker that may be used to indicate a particular location along track 240. In screenshot 200 of FIG. 2, each station 250 is represented as a dot along track 240. In certain embodiments, stations 250 may be labeled with a station name and/or number, a control point name and/or number, a mile post number, and the like. In the illustrated embodiment of FIG. 2, stations 250 are labeled as station numbers 1 through 42.

Maintenance location 252 includes stations 250 that will be affected by maintenance request 220. Maintenance location 252 includes stations 250 numbered 40 through 42. In screenshot 200, maintenance location 252 corresponds to the location provided in maintenance request information 230 for circle-shaped maintenance request 220. In the event that a square-shaped maintenance request 220 is selected, maintenance location 252 will change to include stations 250 that will be affected by the selected square-shaped maintenance request 220.

Rows 254 of screenshot 200 represent stations 250 included in maintenance location 252. First row 254 represents station 40, second row 254 represents station 41, and third row 254 represents station 42. Each row includes markings that indicate activities occurring within a particular time period 280. Time period 280 may extend over any suitable time frame (e.g., hours, days, or weeks). In the illustrated embodiment of FIG. 2, time period 280 starts at 4:00 a.m. on Wednesday, November $27^{th}$ and ends at midnight on Friday, November $29^{th}$. Time period 280 may be selected and/or changed by a user (e.g., a dispatcher). For example, a dispatcher may use a mouse to scroll in for a shorter time period 280 (e.g., 24 hours) and/or scroll out for a longer time period (e.g., seven days).

Trains 260 of screenshot 200 are represented as vertical lines in rows 254. Each vertical line indicates a time, in accordance with time period 280, that train 260 will cross a particular station 250. For example, in first row 254, train 260 represented by the first vertical line indicates that train 260 will cross station 40 at 4:00 a.m. While the illustrated embodiment of FIG. 2 uses vertical line notations to represent trains 260, any suitable notations (e.g., characters, letters, numbers, colors, and/or shapes) may be used to represent trains 260. In certain embodiments, the train notations may differ to indicate different types of trains 260. For example, a thin vertical line may represent a shuttle train and a thicker vertical line may represent a destination efficiency train. As another example, an asterisk may represent a coal unit train and a hashtag may represent a grain unit train.

Maintenance windows 270 of screenshot 200 are represented as hatched blocks in rows 254. The beginning of each hatched block indicates a scheduled start time for each maintenance window 270 and the end of each hatched block indicates a scheduled end time for each maintenance window 270. For example, in first row 254, maintenance window 270 represented by the first block indicates that maintenance window 270 is scheduled from 7:30 p.m. on Wednesday, November $27^{th}$ until 3:00 a.m. on Thursday, November $28^{th}$. While the illustrated embodiment of FIG. 2 uses hatched block notations to represent maintenance windows 270, any suitable notations (e.g., characters, letters, numbers, colors, and/or shapes) may be used to represent maintenance windows 270.

As such, screenshot 200 of FIG. 2 provides a visual aid that allows users of maintenance planning tool 140 of FIG. 1 to maximize usage of visual gaps between train flow and maintenance windows, which may provide for more efficient maintenance scheduling by reducing idle time on capacity-constrained operating subdivisions.

Although FIG. 2 illustrates a particular arrangement of tabs 210, maintenance requests 220, maintenance request information 230, track 240, rows 242, stations 250, maintenance location 252, rows 254, trains 260, maintenance windows 270, and time period 280, this disclosure contemplates any suitable arrangement of tabs 210, maintenance requests 220, maintenance request information 230, track 240, rows 242, stations 250, maintenance location 252, rows 254, trains 260, maintenance windows 270, and time period 280. For example, tabs 210 and/or maintenance request information 230 may be displayed in a different order. As another example, time period 280 may span more or less than three days.

Although FIG. 2 illustrates a particular number of tabs 210, maintenance requests 220, maintenance request information 230, tracks 240, rows 242, stations 250, maintenance locations 252, rows 254, trains 260, maintenance windows 270, and time periods 280, this disclosure contemplates any suitable number of tabs 210, maintenance requests 220, maintenance request information 230, tracks 240, rows 242, stations 250, maintenance locations 252, rows 254, trains 260, maintenance windows 270, and time periods 280. For example, FIG. 2 may include more or less than 42 stations. While screenshot 200 of FIG. 2 is associated with a railroad system, screenshot 200 may be associated with any suitable transportation system (e.g., vehicles/roadways, vessels/waterways, and the like).

FIG. 3 shows an example method 300 for scheduling track maintenance. Method 300 begins at step 310. At step 320, a maintenance planning tool (e.g., maintenance planning tool 140 of FIG. 1) generates a first visual representation of railroad station locations in relation to railroad tracks. For example, referring to FIG. 2, the maintenance planning tool may generate stations 1 through 42 on track 240 of subdivision 202. Method 300 then moves from step 320 to step 330.

At step 330, the maintenance planning tool receives a maintenance request. For example, a train engineer (e.g., user 122a of FIG. 1) may determine that maintenance needs to be performed at particular railroad stations in a particular subdivision. The train engineer uses a mobile phone (e.g., UE 120a of FIG. 1) to generate a maintenance request (e.g., maintenance request 124 of FIG. 1). The maintenance request may include the specific railroad stations where the maintenance is to be performed, the name of the crew that is to perform the maintenance, a requested time duration (e.g., 6 hours) for the maintenance, and a maintenance description. The train engineer sends the maintenance request to a dispatcher (e.g., user 122b of FIG. 1) of a network operations center (e.g., network operations center 130 of FIG. 1). The dispatcher uses the maintenance planning tool to process the maintenance request. Method 300 then moves from step 330 to step 340.

At step 340, the maintenance planning tool determines that the maintenance request is associated with a particular subset of the railroad stations. For example, the maintenance planning tool may determine, from information provided in the maintenance request, that the requested maintenance will affect stations 40 through 42 of subdivision 202. The maintenance planning tool may accentuate (e.g., highlight, shade, etc.) stations 40 through 42 on the first visual representation, which allows the user of the maintenance planning tool to visually identify the affected stations. Method 300 then moves from step 340 to step 350.

At step 350, a user of the maintenance planning tool predicts a time period to schedule the requested maintenance. For example, a dispatcher may predict, based on a requested 6-hour maintenance window included in the maintenance request, that the maintenance can be scheduled between 4:00 a.m. on November $27^{th}$ and midnight on November $29^{th}$. The dispatcher may then select that particular time period using the maintenance planning tool. Method 300 then moves from step 350 to step 360.

At step 360, the maintenance planning tool generates a second visual representation of information associated with the selected railroad stations during the selected time period. In certain embodiments, this information includes indications of the times that trains are scheduled to cross the railroad stations during the selected time period. For example, the second visual representation may show a line representing a train crossing at a particular time during the selected time period. In some embodiments, this information includes indications of time durations for previously requested and/or scheduled maintenance windows during the selected time period. For example, the second visual representation may show a hatched block representing a start time and an end time for a previously requested and/or scheduled maintenance window. The first visual representation and the second visual representation may be displayed as a single image (e.g., screenshot 200 of FIG. 2) on the dispatcher's device. Method 300 then moves from step 360 to step 370.

At step 370, the dispatcher determines whether the information in the second visual representation shows that a previously requested/scheduled maintenance window or train crossing interferes with the requested maintenance window. If the dispatcher determines that the information in the second visual representation does not interfere with the requested maintenance window (e.g., the information does not show any previously requested/scheduled maintenance windows or train crossings within the requested maintenance window), or if the interference is acceptable, method 300 moves from step 370 to step 380.

At step 380, the dispatcher schedules the maintenance window during the predicted time period. For example, the requested maintenance window may be six hours, and the second visual representation may show that stations 40 through 42 have a six hour window (e.g., from noon to 6:00 p.m. on November $27^{th}$) within the selected time period that show no previously requested/scheduled maintenance windows and/or train crossings. The dispatcher then schedules the maintenance window during that six hour window. As another example, the requested maintenance window may be six hours, and the second visual representation may show that stations 40 through 42 have a six hour window (e.g., from noon to 6:00 p.m. on November $27^{th}$) within the selected time period with only one conflict (e.g., a train crossing or scheduled maintenance window). The dispatcher then resolves the conflict (e.g., delays the train or reschedules the scheduled maintenance window) and schedules the requested maintenance window during that six hour window.

If, at step 370, the dispatcher determines that the information in the second visual representation shows previously requested/scheduled maintenance windows and/or train crossings within the requested maintenance window that cannot be rescheduled, method 370 moves back to step 350, where the dispatcher selects a different time period to schedule the maintenance window. For example, the dispatcher may select a time from midnight on November $29^{th}$ to midnight on December $3^{rd}$. Steps 360 to 380 are then repeated until the dispatcher determines that the information in the second visual representation does not show unresolvable previously requested/scheduled maintenance windows and/or train crossings within the requested maintenance window. Method 300 then moves from step 380 to step 390, where method 300 ends.

Modifications, additions, or omissions may be made to method 300 depicted in FIG. 3. Method 300 may include more, fewer, or other steps. For example, method 300 may include generating a maintenance reply (e.g., maintenance reply 144 of FIG. 1) and communicating the maintenance reply to the train engineer. Method 300 may be associated with any suitable transportation system (e.g., vehicles/roadways, vessels/waterways, and the like).

Steps may be performed in parallel or in any suitable order. For example, step 320 directed to generating the first visual representation may occur after step 330 directed to receiving the maintenance request. While discussed as specific components completing the steps of method 300, any suitable component may perform any step of method 300. For example, one or more steps of method 300 may be automated using one or more components of the computer system of FIG. 4.

FIG. 4 shows an example computer system that may be used by the systems and methods described herein. For example, network 110, UE 120*a*, and/or UE 120*b* of FIG. 1 may include one or more interface(s) 410, processing circuitry 420, memory(ies) 430, and/or other suitable element(s). Interface 410 (e.g., interface 122 of FIG. 1) receives input, sends output, processes the input and/or output, and/or performs other suitable operation. Interface 410 may comprise hardware and/or software.

Processing circuitry 420 (e.g., processor 126 of FIG. 1) performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 (e.g., memory 124 of FIG. 1) may comprise one or more non-transitory, tangible, computer-readable, and/or computer-executable storage media. Examples of memory 430 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   displaying, on a graphical user interface (GUI), a first visual representation of locations for a plurality of railroad stations in relation to a plurality of railroad tracks;
   receiving a request for a first maintenance window;
   determining that the request for the first maintenance window is associated with a subset of the plurality of railroad stations;
   displaying, in the first visual representation, a visual indication indicating that the subset of the plurality of railroad stations is associated with the maintenance request;
   determining a first time period;
   receiving, via the first visual representation displayed on the GUI, a selection of a railroad station from the subset of the plurality of railroad stations associated with the maintenance request;
   displaying, on the GUI, in response to the selection of the railroad station on the first visual representation, a second visual representation of information associated with the subset of the plurality of railroad stations associated with the maintenance request covering the first time period, wherein the information comprises:
      an indication of a time that a respective train is scheduled to cross one or more of the subset of the plurality of railroad stations associated with the maintenance request during the first time period; and
      an indication of a time duration for a second maintenance window for a respective railroad station of the subset that has been scheduled to occur during the first time period, wherein the indication of the time that the respective train is scheduled to cross the one or more of the subset of the plurality of railroad stations associated with the maintenance request and the indication of the time duration for the second maintenance window are presented in the second visual representation concurrently;
   displaying, on the GUI, the first visual representation and the second visual representation as a single visual representation indicating the subset of the plurality of railroad stations associated with the maintenance request and one or more traffic gaps within the first time period, the one or more traffic gaps representing durations of time uninterrupted by a train scheduled to cross the railroad station or another maintenance window, wherein the indication of the time that the respective train is scheduled to cross the one or more of the subset of the plurality of railroad stations associated with the maintenance request is different from the indication of the time duration for the second maintenance window; and
   providing a control element on the single visual representation to enable scheduling the first maintenance window within one of the one or more traffic gaps.

2. The method of claim 1, wherein the request for the first maintenance window comprises:
   a name of a maintenance crew;
   a requested time duration for the first maintenance window; and
   a maintenance description.

3. The method of claim 1, further comprising scheduling the first maintenance window within the first time period based on the second visual representation.

4. The method of claim 1, further comprising:
   selecting a second time period.

5. The method of claim 1, further comprising:
   determining, based on the second visual representation, that a time duration for the first maintenance window conflicts with the time duration of the second maintenance window during the first time period; and
   selecting a second time period.

6. The method of claim 1, further comprising:
   generating, in the second visual representation, information associated with the subset of the plurality of railroad stations.

7. The method of claim 1, further comprising:
generating a map view that displays the first maintenance window; and
generating a calendar that displays a date and a time duration for the first maintenance window.

8. A system comprising one or more processors and a memory storing instructions that, when executed by the one or more processors, cause the one or more processors to perform operations comprising:
displaying, on a graphical user interface (GUI), a first visual representation of locations for a plurality of railroad stations in relation to a plurality of railroad tracks;
receiving a request for a first maintenance window;
determining that the request for the first maintenance window is associated with a subset of the plurality of railroad stations;
displaying, in the first visual representation, a visual indication indicating that the subset of the plurality of railroad stations is associated with the maintenance request;
determining a first time period;
receiving, via the first visual representation displayed on the GUI, a selection of a railroad station from the subset of the plurality of railroad stations associated with the maintenance request;
displaying, on the GUI, in response to the selection of the railroad station on the first visual representation, a second visual representation of information associated with the subset of the plurality of railroad stations associated with the maintenance request covering the first time period, wherein the information comprises, wherein the information comprises:
an indication of a time that a respective train is scheduled to cross one or more of the subset of the plurality of railroad stations associated with the maintenance request during the first time period; and
an indication of a time duration for a second maintenance window for a respective railroad station of the subset that has been scheduled to occur during the first time period, wherein the indication of the time that the respective train is scheduled to cross the one or more of the subset of the plurality of railroad stations associated with the maintenance request and the indication of the time duration for the second maintenance window are presented in the second visual representation concurrently;
displaying, on the GUI, the first visual representation and the second visual representation as a single visual representation indicating the subset of the plurality of railroad stations associated with the maintenance request and one or more traffic gaps within the first time period, the one or more traffic gaps representing durations of time uninterrupted by a train scheduled to cross the railroad station or another maintenance window, wherein the indication of the time that the respective train is scheduled to cross the one or more of the subset of the plurality of railroad stations associated with the maintenance request is different from the indication of the time duration for the second maintenance window;
determining, based on the second visual representation, that a requested time duration for the first maintenance window conflicts with the time that the train is scheduled to cross the railroad station during the first time period; and
providing a control element on the single visual representation to enable scheduling the first maintenance window within the traffic gap based on the determining that that the requested time duration for the first maintenance window conflicts with the time that the train is scheduled to cross the railroad station during the first time period.

9. The system of claim 8, wherein the request for the first maintenance window comprises:
a name of a maintenance crew;
the requested time duration for the first maintenance window; and
a maintenance description.

10. The system of claim 8, the operations further comprising:
selecting a second time period.

11. The system of claim 8, the operations further comprising:
determining, based on the second visual representation, that a requested time duration for the first maintenance window conflicts with the time duration of the second maintenance window during the first time period; and
selecting a second time period.

12. The system of claim 8, the operations further comprising:
generating, in the second visual representation, information associated with the subset of the plurality of railroad stations.

13. The system of claim 8, the operations further comprising:
generating a map view that displays the first maintenance window; and
generating a calendar that displays a date and a time duration for the first maintenance window.

14. One or more non-transitory computer-readable storage media embodying instructions that, when executed by a processor, cause the processor to perform operations comprising:
displaying, on a graphical user interface (GUI), a first visual representation of locations for a plurality of railroad stations in relation to a plurality of railroad tracks;
receiving a request for a first maintenance window;
determining that the request for the first maintenance window is associated with a subset of the plurality of railroad stations;
displaying, in the first visual representation, a visual indication indicating that the subset of the plurality of railroad stations is associated with the maintenance request;
determining a first time period;
receiving, via the first visual representation displayed on the GUI, a selection of a railroad station from the subset of the plurality of railroad stations associated with the maintenance request;
displaying, on the GUI, in response to the selection of the railroad station on the first visual representation, a second visual representation of information associated with the subset of the plurality of railroad stations associated with the maintenance request covering the first time period, wherein the information comprises, wherein the information comprises:
an indication of a time that a respective train is scheduled to cross one or more of the subset of the plurality of railroad stations associated with the maintenance request during the first time period; and
an indication of a time duration for a second maintenance window for a respective railroad station of the subset that has been scheduled to occur during the first time period, wherein the indication of the time that the respective train is scheduled to cross the one or more of the subset of the plurality of railroad stations associated with the maintenance request and the indication of the time duration for the second maintenance window are presented in the second visual representation concurrently;

displaying, on the GUI, the first visual representation and the second visual representation as a single visual representation indicating the subset of the plurality of railroad stations associated with the maintenance request and one or more traffic gaps within the first time period, the one or more traffic gaps representing durations of time uninterrupted by a train scheduled to cross the railroad station or another maintenance window, wherein the indication of the time that the respective train is scheduled to cross the one or more of the subset of the plurality of railroad stations associated with the maintenance request is different from the indication of the time duration for the second maintenance window;

determining, based on the second visual representation, that a requested time duration for the first maintenance window conflicts with the time that the train is scheduled to cross the railroad station during the first time period; and providing a control element on the single visual representation to enable scheduling the first maintenance window within the traffic gap based on the determining that that the requested time duration for the first maintenance window conflicts with the time that the train is scheduled to cross the railroad station during the first time period.

15. The one or more non-transitory computer-readable storage media of claim 14, wherein the request for the first maintenance window comprises:
   a name of a maintenance crew;
   the requested time duration for the first maintenance window; and
   a maintenance description.

16. The one or more non-transitory computer-readable storage media of claim 14, the operations further comprising:
   selecting a second time period.

17. The one or more non-transitory computer-readable storage media of claim 14, the operations further comprising:
   determining, based on the second visual representation, that a requested time duration for the first maintenance window conflicts with the time duration of the second maintenance window during the first time period; and
   selecting a second time period.

18. The one or more non-transitory computer-readable storage media of claim 14, the operations further comprising:
   generating, in the second visual representation, information associated with the subset of the plurality of railroad stations.

* * * * *